United States Patent [19]

Masuda et al.

[11] Patent Number: 5,012,228
[45] Date of Patent: Apr. 30, 1991

[54] METHOD OF OPERATION FOR AN ACTIVE MATRIX TYPE DISPLAY DEVICE

[75] Inventors: Kiyoshi Masuda, Tokorozawa; Shigeto Kohda; Shigenobu Sakai, both of Tokyo; Kazuo Kimura, Tokorozawa; Tomoyoshi Nomura, Tokyo, all of Japan

[73] Assignee: Nippon Telegraph and Telephone, Tokyo, Japan

[21] Appl. No.: 551,034

[22] Filed: Jul. 10, 1990

Related U.S. Application Data

[63] Continuation of Ser. No. 224,080, Jul. 25, 1988, abandoned.

[30] Foreign Application Priority Data

Aug. 4, 1987 [JP] Japan .................................. 62-193763

[51] Int. Cl.$^5$ .............................................. G09G 3/36
[52] U.S. Cl. ..................................... 340/702; 340/701; 340/784; 350/339 F
[58] Field of Search ............... 340/701, 702, 703, 718, 340/719, 765, 783, 784, 785, 786, 787, 788, 805; 350/332, 333, 339 F

[56] References Cited

U.S. PATENT DOCUMENTS

| 4,317,115 | 2/1982 | Kawakami et al. | 340/784 |
| 4,716,403 | 12/1987 | Morozumi | 340/784 |
| 4,803,480 | 2/1989 | Soneda et al. | 340/784 |
| 4,890,097 | 12/1989 | Yamashita et al. | 340/784 |

FOREIGN PATENT DOCUMENTS

| 0182645 | 5/1986 | European Pat. Off. |
| 56-77887 | 6/1981 | Japan |
| 61-20091 | 1/1986 | Japan |
| 61-121034 | 6/1986 | Japan |
| 61-128289 | 6/1986 | Japan |
| 2115199 | 9/1983 | United Kingdom |

OTHER PUBLICATIONS

IEEE Transactions on Electron Devices, vol. ED-20, No. 11, Nov. 1973—"A 6×6 Inch 20 Lines-Per-Inch Liquid-Crystal Display Panel"; Brody et al., pp. 995-1001.

Primary Examiner—Jeffery A. Brier
Attorney, Agent, or Firm—Frishauf, Holtz, Goodman & Woodward

[57] ABSTRACT

An active matrix type display device is disclosed having an m number of unit pixel array blocks repetitively arranged in a row direction. Each pixel array block comprises a k rows×n columns matrix of display elements ($C_{ij}$, i=1, 2, ... n, j=1, 2, ... n) and scanning lines G1 ... Gn and data signal lines D1 ... Dn are arranged in an intersecting fashion with first and second switching elements of each display element connected to the corresponding lines in a manner to provide different data input routes.

1 Claim, 6 Drawing Sheets

METHOD OF OPERATION FOR AN ACTIVE MATRIX TYPE DISPLAY DEVICE

This application is a continuation of application Ser. No. 224,080, filed July 25, 1988, now abandoned.

BACKGROUND OF THE INVENTION

1. Field of the Invention

The present invention relates to an improved active matrix type display device and, in particular, an active matrix type display device which can provide a plurality of data input routes for writing a data signal into respective display elements and can make a normal display even if any break or imperfection occurs at a spot or spots in an associated interconnection.

2. Description of the Related Art

The development of active matrix type display devices has recently been made, in place of simple matrix type liquid crystal devices, which is excellent in their contrast and in their visibility-angle characteristic.

Figure 1:
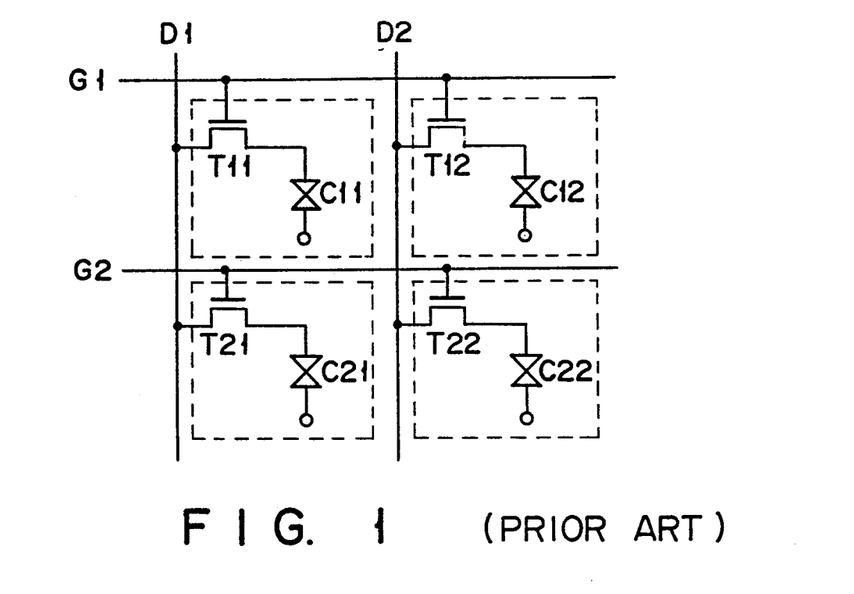
FIG. 1 is a schematic view showing a pixel array block in a conventional active matrix type display device.

FIG. 1 shows a portion of a pixel array in a conventional active matrix type display device. This type of display device is disclosed, for example, in a document "IEEE Transactions ON ELECTRON DEVICES" Vol. ED-20, No. 11, November 1973, P 996. As shown in this document, a liquid crystal is employed for a display device with field effect transistors used as switching elements. C11 to C22 and T11 to T22 represent display elements and field effect transistors T11 to T22, respectively, and D1, D2 and G1, G2 represent data lines and scanning lines, respectively. That is, pixels as enclosed by broken lines in FIG. 1 are arranged in a matrix array with each constituted by the field effect transistor and display element. For a display to be made, one of scanning lines G1, G2 is selectively energized and a data signal is supplied to a corresponding data line to turn on the corresponding field effect transistor. The data signal is supplied via the turned-on field effect transistor to the corresponding display element. The display elements are displayed as light and dark according to whether or not the corresponding data-signal voltage is high or low.

If the number of scanning lines and data lines and hence that of switching elements are increased, it will be very difficult to manufacture them without any defects. In the conventional active matrix type display device as shown in FIG. 1, only one write-in route for writing the data signal into the display element is present and, if any defects occur, during manufacture, at the scanning lines, data lines or field effect transistors, no data signals are applied to the display elements so that no normal display can be carried out. The manufacturing yield will rapidly drop partly because the defects of component parts occur during manufacture and partly because the component parts have to be microminiaturized in spite of a great area involved. In order to solve the aforementioned problem, a plurality of FETs are connected in parallel to a single pixel electrode as shown, for example, in Japanese Patent Disclosure (Kokai) No. 56-77887 so that any defective FETs may be found at the stage of manufacture and removed from the rest of the FETs. It is, therefore, possible to employ good FETs alone. Another solution is disclosed in Japanese Patent Disclosure (KOKAI) No. 61-121034 in which two FETs are connected in parallel to a single pixel and their gates are connected to two scanning lines with a pixel sandwiched with these two lines and their source are connected commonly to a corresponding data signal line. In this case, if one of the two FETs is defective, the associated pixel can be driven with the other FET. Another solution is disclosed in Japanese Patent Disclosure (KOKAI) No. 61-128289. In a liquid crystal display device having a TFT array as shown in that KOKAI, a back-up electrode is provided adjacent to a main electrode and, if being broken at their connection, is connected to the main electrode, so that the downgrading of a display can be prevented without producing any panel image effects.

The conventional methods, however, require an additional step, such as the step of detecting defective elements or spots or the step of making a connection or a disconnection, thus offering an economical disadvantage.

Figure 2:
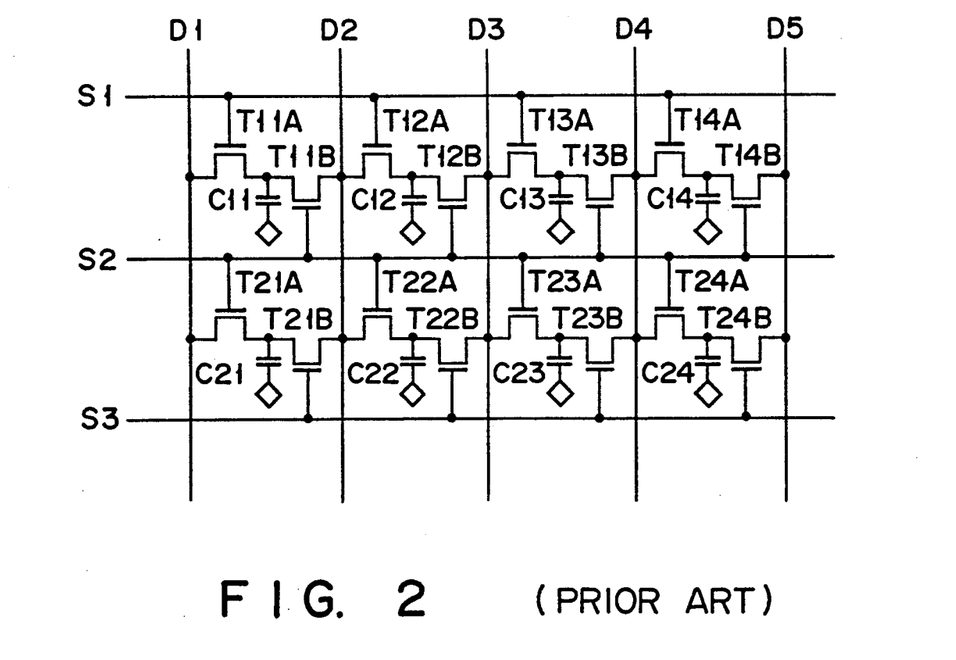
FIG. 2 is a schematic view showing a display element showing part of a matrix array in an active matrix type display device as shown in Japanese Patent Disclosure (KOKAI) No. 61-20091.

The inventors disclose an active matrix type display device, in connection with Kokai No. 61-20091, which includes a plurality of data input routes for writing a data signal into a respective display elements. In the arrangement shown in FIG. 2, two FETs are provided for a respective display element so that each is connected to respective different display data line and scanning line. A plurality of routes for applying a display signal to the display element are provided and, even if defects occur at the data input route during manufacture, a normal display can be made without being affected by a periodic switching. It is thus possible to provide a better display than in the aforementioned prior art. In Japanese Patent Disclosure (KOKAI) No. 61-20091, an improved matrix array is disclosed where switching elements for adjacent two rows as provided for respective display elements are connected to a common scanning line so as to reduce the number of scanning lines and of scanning line drive circuits.

In this arrangement, display elements are arranged as an n rows × m columns matrix array in a manner defined by sequentially-numbered data lines and scanning lines. Since a top-down scanning is performed in an odd-numbered frame and bottom-up scanning is performed in an even-numbered frame, electric potentials on the electrodes of the display elements on the 1st, n/2-th and n-th rows in the array never vary uniformly with a variation in time. That is, in the display element electrodes on the n/2-th row, the write-in cycle becomes equal to the frame period and a variation of the voltage becomes regular. Since, in the display element electrodes on the 1st and n-th rows, long and short cycles are alternately repeated, an irregular potential appears on the electrodes of the display elements. For this reason, a difference in contrast ratio is produced at the central portion and at the upper and lower portions of a display panel, resulting in nonuniform image display. Furthermore, one of the data input routes is not available due to a break at its connection and the display quality is prominently downgraded at the upper and lower portions of the display panel due to an unbalance in the write-in cycle.

SUMMARY OF THE INVENTION

It is accordingly the object of the present invention to provide an active matrix type display device which, in order to compensate for a break or imperfection at display elements without increasing any additional steps, can switchingly write normal display data and back-up display data for respective corresponding frames via different display data input routes so that a normal data display can be achieved.

In order to achieve the aforementioned object an active matrix type display device is provided which comprises:

an m number (m≧2) of pixel array blocks arranged in a row direction, each pixel array block having a plurality of display elements (Cij; i=1,2, ... k; j=1,2, ... n) arranged as a K rows×n columns (K≧2, n≧1) array;

a K+1 number of scanning lines (G1, ... , GK+1) arranged in said row direction to supply scanning signals for selectively scanning the corresponding display elements, the scanning lines being commonly used for the display elements in each pixel array block;

an n+1 number of data lines (D1 ... Dn+1) arranged in a column direction to supply data signals to the corresponding display elements, the data lines being arranged in an intersecting fashion relative to said scanning lines and commonly used for the corresponding display elements in each pixel array block;

first switching elements connected between one Dj of two adjacent data lines and a corresponding display element and connected at their gate to one Gi of two adjacent scanning lines and selectively controlled in an ON-OFF fashion in accordance with the scanning signal from the scanning line; and second switching elements connected between the other data line Dj+1 and the corresponding display element and connected at their gate to the other scanning line $G_{(i+1}{}^{i-1})$ and selectively controlled in an ON-OFF fashion in accordance with the scanning signal from the scanning line, whereby different display data input routes are established relative to the display elements in each pixel array block which are connected between said two adjacent data lines.

In the active matrix type display device of the present invention a scanning line commonly connected to switching elements located, respectively, in i-th and (i+1)-th rows of, for example, a K+1 number of scanning lines is sequentially selected and, after this step has been varied out, one of two non-selected scanning lines is alternately selected in a corresponding frame so that normal data can be written into the display element through the utilization of two different display data input routes. At this time, if there is any local break or imperfection at the scanning lines and switching elements, no defective data input route is selected so that it is automatically separated from an associated data line. The method of the present invention obviates the necessity of, for example, separating a defect spot or spots through the utilization of a laser trimming method or performing a wiring interconnection with the use of a wire bonding method. It is thus possible to provide inexpensive active matrix type display devices in high yield. Furthermore, an m number (m≧2) of unit pixel array blocks are arranged in a parallel array and data lines D1 to Dn+1 are commonly employed so that a uniform normal image display free from a difference in contrast ratio can be obtained on a display panel without involving any irregular fluctuation in potential on the display element electrodes which has been encountered in the conventional display devices.

DETAILED DESCRIPTION OF THE INVENTION

Figure 3:
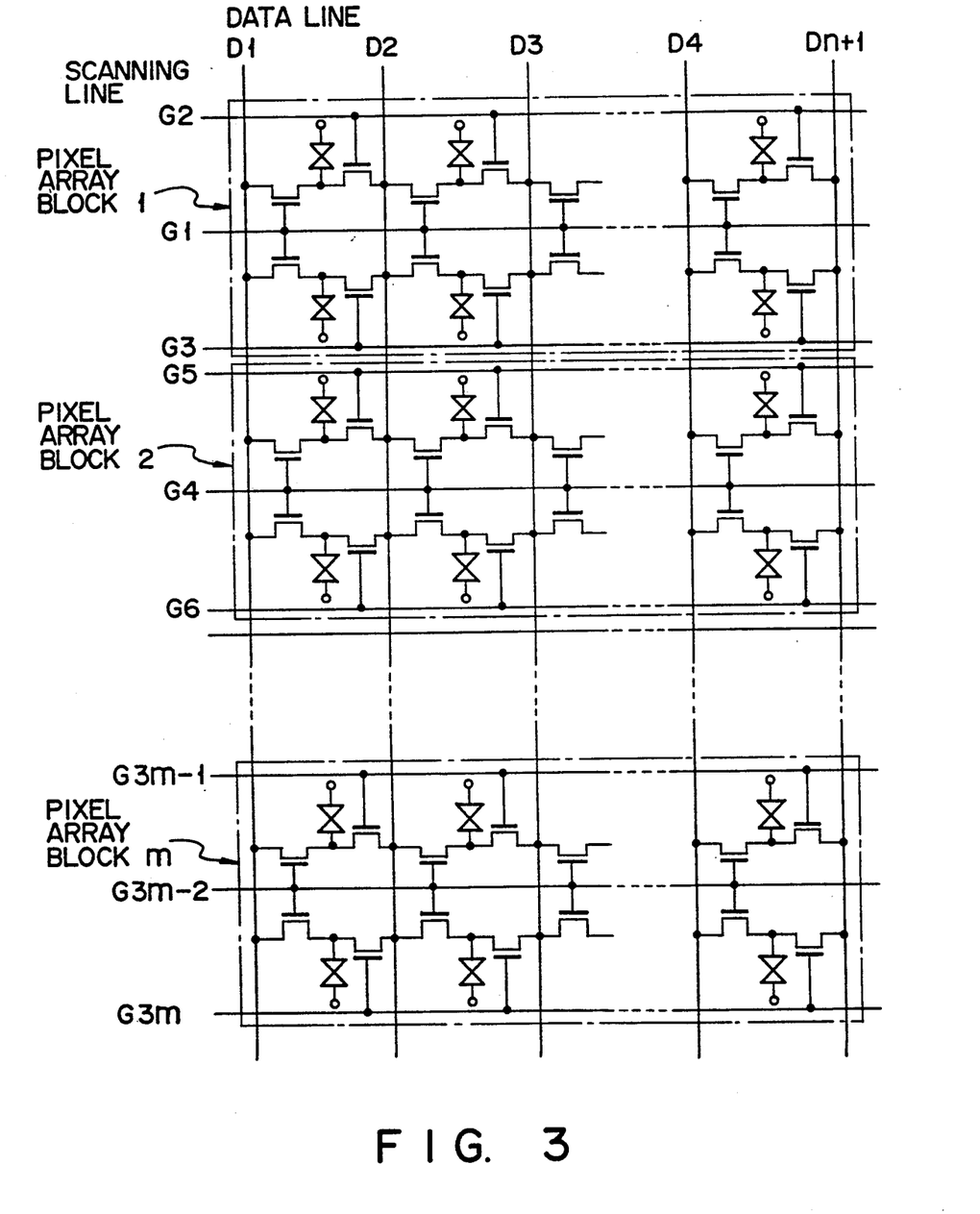
FIG. 3 is a schematic view showing an m number of unit pixel array blocks, constituted by a 2 rows×n columns display elements, in an active matrix type display device according to one embodiment of the present invention.

FIG. 3 is a schematic view showing an active matrix type display device according to one embodiment of the present invention. In this embodiment, a liquid crystal is employed for a display device with field effect transistors used as switching elements. In FIG. 3, an m number of pixel array blocks each indicated by the broken lines are repetitively arranged in the row direction and D1 to Dn+1 and G1 to G3m represent data and scanning lines, respectively.

Figure 4:
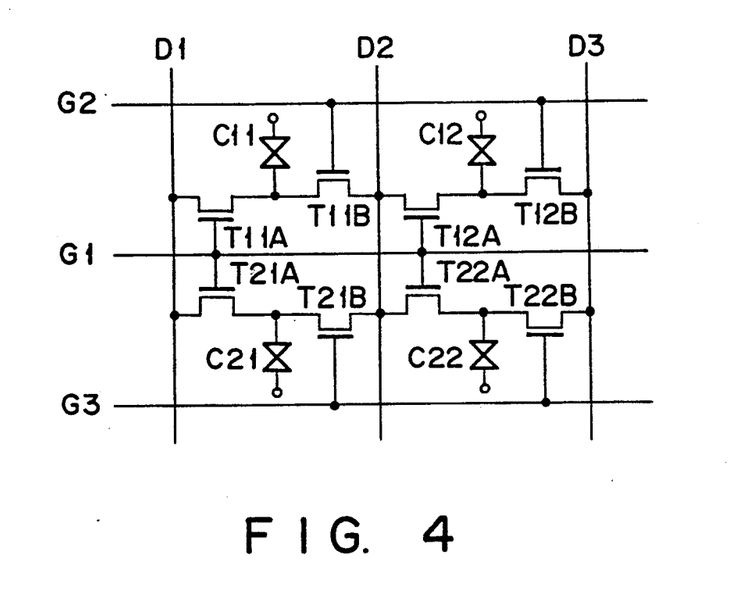
FIG. 4 is a schematic view showing a 2 rows×2 columns unit pixel array block for explaining an operation of the active matrix type display device of the present invention.

FIG. 4 shows one pixel array block of an active matrix type display device of the present invention. For brevity in explanation, a 2 rows×2 columns display device will be explained below. C11 to 22, T11A and T11B ... T22A to T22B, D1 to D3 and G1 to G3 represent display elements, field effect transistors, data lines and scanning lines, respectively. Display elements C11, ... , C22 are connected at one end to pairs of field effect transistors T11A. T11B; T12A, T12B; T21A, T21B; and T22A, T22B, respectively. In display element C11, for example, the drain of field effect transistors T11A are connected to display element C11; the gate and source of field effect transistor T11A are connected to scanning line G1 and data line D1, respectively; and the gate and source of field effect transistor T11B are connected to scanning line G2 and data line D2, respectively.

In such a unit pixel array block structure, the writing of data into the respective display element is achieved differently in odd- and even-numbered frames as will be set out below.

In the odd-numbered frame, scanning line G1 is selected and data signals are supplied respectively through data lines D1 and D2 to display elements C21 and C22. As a result, field effect transistors T21A and T22A are turned ON to allow display data to be supplied to display elements C21 and C22. At the same time, field effect transistors T11A and T12A are turned ON in which case the display data the same as those to be written into display elements C21 and C22 are supplied to display elements C11 and C12, respectively. Then scanning line G1 is not selected and scanning line G2 is selected. Data signals to be supplied to display elements C11 and C12 are applied respectively through data lines D2 and D3 and field effect transistors T11B and T12B are turned ON, allowing display data to be written into display elements C11 and C12. That is, at display elements C11 and C12, the data signal (hereinafter referred to as a back-up data signal as opposed to normal data signal) is temporarily written into the adjacent one of them, but it is immediately rewritten as a normal data signal. At display elements C21 and C22, the corresponding field effect transistors are placed all in the OFF state and hence the normal data signal are held as it is. Thus the normal display data is written into each of display elements C11 to C22.

In the even-numbered frame, scanning line G1 is selected and a data signal to be written into display elements C11 and C12 is applied respectively through data lines D1 and D2. As a result, the respective display data the same as those to be written into display elements C11 and C12 are supplied to display elements C21 and C22, respectively. Then with scanning line G1 not selected and scanning line G3 selected, data signals to be written into display elements C21 and C22 are supplied respectively through data lines D2 and D3. As a result, field effect transistors T21B and T22B are turned ON, allowing display data to be written into display elements C21 and C22, respectively. That is, at display elements C21 and C22, a back-up data signal is temporarily written in the same way as set forth above, but it is immediately rewritten as a normal data signal. Since at display elements C11 and C12 the corresponding field effect transistors are placed all in the OFF state and hence the data signal is held as it is. In this way, the writing of the normal data is achieved relative to each of display elements C11 to C22.

As evident from the above, in the pixel array structure, the back-up and normal data signals are written, once per two frames, through the corresponding two data input routes in a manner to be set forth above. If one of the data input routes are unavailable due to a break in its connection, the writing of the data signal can be achieved through the other data input route. Now assume that, due to a defect of scanning line G1, the associated field effect transistors T11A, T12A, T21A and T22A are placed all in a normally-off state. In this case, only field effect transistors T11B and T12B are turned ON in an odd-numbered frame and normal data signals are written into display elements C11 and C12. In an even-numbered frame, field effect transistors T21B and T22B alone are turned ON and the normal data signals are written into display elements C21 and C22. That is, if the corresponding data signal is held as write-in data over the period of two frames, the writing of the normal data signal is achieved, once per frame, relative to either of display elements C11, C12 and C12, C22, thus obtaining a normal image display. Let it be assumed that, due to a defect of scanning line G2, the associated field effect transistors T11B and T12B are placed all in a normally-off state. In this case, in the odd-numbered frame, since the data signal when scanning line G1 is selected is held in the respective associated display elements, the back-up data signal is held in display elements C11 and C12 and the normal data signal is held in display elements C21 and C22. Since, in the even-numbered frame, scanning line G2 is not selected, the normal data is written into the associated display elements. That is, the normal data signal is written into display elements C11 and C12 when scanning line G1 is selected and into display elements C21 and C22 when scanning line G3 is selected.

That is, in the odd-numbered frame, the data signals associated with data lines D2 and D3 are displayed on the first row in a manner such that the display state on the second row associated with data lines D1 and D2 is shifted one row. If the scanning density and hence the image resolution are increased, the display data on the first and second rows become equal to each other, offering a greater chance of the same image appearing on the lines. It is thus possible to make a normal display on the majority of display elements on the first row. When different display data happen to be involved on the first and second rows, different display data is written into the associated display elements on the first row. For example, the data signals are alternately applied to display elements, that is, a high voltage data signal for the odd-numbered frame and a low voltage data signal for the even-numbered frame. Whether, in this state, a light or dark level is displayed on the associated display elements is determined by the threshold value characteristic, application voltages and so on, and an agreeable display can be obtained by making a light- or a dark-level display in accordance with a display mode.

Even if scanning line G3 fails, the same write-in operation as that in the case of the defect of scanning line G2 can be performed in a manner set out below and any further explanation is omitted.

Figure 5:
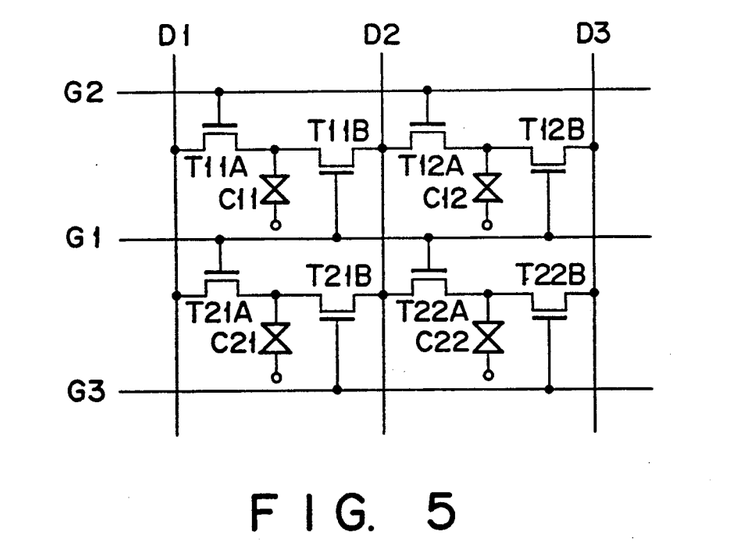
FIG. 5 is a schematic view, different from that in FIG. 4, showing a 2 rows×2 columns unit pixel array block in an active matrix type display device according to another embodiment of the present invention.

FIG. 5 shows another embodiment of the present invention. In the embodiment shown in FIG. 5, the same reference numerals are employed to designate parts or elements corresponding to those shown in FIG. 4. In the embodiment shown in FIG. 4, in order to provide different data flow routes relative to the associated display elements on the respective row, first and second switching elements on the respective row are controlled in ON-OFF fashion and the first and second switching elements are provided for each display element on the row with the respective first switching elements of the respective display elements on the first and second rows commonly connected at their gates to one scanning line and with the respective second switching elements of the respective display elements independently connected to another scanning line adjacent to the aforementioned common scanning line. In the embodiment shown in FIG. 5, on the other hand, first and second switching elements are so connected that the first switching elements corresponding to the associated display elements on one row and second switching elements corresponding to the associated display elements on another row are connected to a common scanning line with the first switching elements on the row independently connected to the corresponding scanning line and with the second switching elements on the same row independently connected to another corresponding scanning line.

With attention paid to display element C11 in FIG. 5, field effect transistors T11A and T11B are connected at their drain to display element C11, the gate and source of field effect transistor T11A are connected to scanning line G2 and data line D1, respectively, and the gate and source of field effect transistor T11B are connected to scanning line G1 and data line D2, respectively. In this embodiment, scanning line G1 is selected in an odd frame and data signals to be written into display elements C21 and C22 are applied via data lines D1 and D2, respectively. As a result, normal data signals are written into display elements C21 and C22. With scanning line G1 selected, a data signal to be written into display element C22 is supplied as a back-up signal to display element C11 and data signal to be written into a diagonally right-down adjacent display element (not shown) in the rows × columns matrix array is supplied to display element C12. That is, in this embodiment, the back-up data signal is a data signal for the diagonally right-down adjacent display element. Then the scanning line G1 is not selected and scanning line G2 is selected. By so doing, the data signals to be written into display elements C11 and C12 are applied via data lines D1 and D2 to allow the display data of display elements C11 and C12 to be rewritten as normal data at which time normal data signals are held, at display elements C21 and C22, as they are. In an even-numbered frame, scanning line G1 is selected and data signals to be written into display elements C11 and C12 are supplied via data lines D2 and D3, respectively. As a result, normal data signals are written into display elements C11 and C12. At this time, the data signal to be written into display element C11 is supplied as a back-up signal to display element C22 and a data signal to be written into a diagonally left-up display element (not shown) is written as a back-up signal into display element C21. Then scanning line G1 is not selected and scanning line G3 is selected. Data signals to be written into display elements C11 and C12 are applied via data lines D2 and D3 to allow display data of display elements C21 and C22 to be rewritten as normal data at which time normal data signals are held, at display elements C11 and C12, as they are. For the odd- and even-numbered frames, the writing of the normal display data is achieved at display elements C11 to C22.

In this embodiment, the back-up signal is used as display data for the diagonally right-down display element or diagonally left-up display element. In the odd-numbered frame, normal data signals are written relative to display elements C21 and C22 by corresponding data lines connected via the first switching element and in the even-numbered frame the normal data signal is written relative to display elements C11 and C12 by the corresponding data lines connected via the second switching elements. Since, however, two write-in routes are used like the first embodiment, they tolerate a defect or break in the connection of the switching elements and it is, therefore, possible to make a normal display in spite of such a possible defect or break.

In the case where the embodiment of the present invention is applied to a color LCD of a delta RGB array, the back-up data signal can be applied to the display element for a corresponding color even if the corresponding normal data signal cannot be supplied to the associated display element owing to a local defect data input route. It is, therefore, possible to make an agreeable image display according to the present invention.

Figure 10:
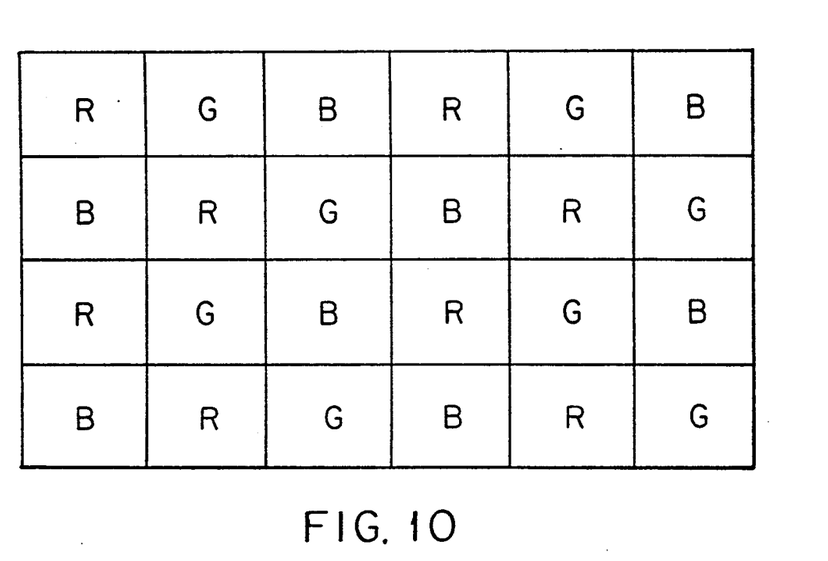
FIG. 10 is a view showing a delta RGB array as embodied in a color liquid crystal display.

FIG. 10 is a view showing a delta RGB array. In a color LCD embodying the delta RGB array, the color of each pixel in an odd-numbered row is equal to that of a pixel in the next column of the corresponding pixel in the next even-numbered row. Therefore, if the pixel array shown in FIG. 5 is applied to a color LCD of the delta RGB array as in FIG. 10, back-up data to be written into pixels of same color, is supplied. Thus, even if the normal data cannot be provided owing to a defect in the write-in route, adjacent pixels of the same color are obtained and an acceptable color image display is achieved.

Figure 6:
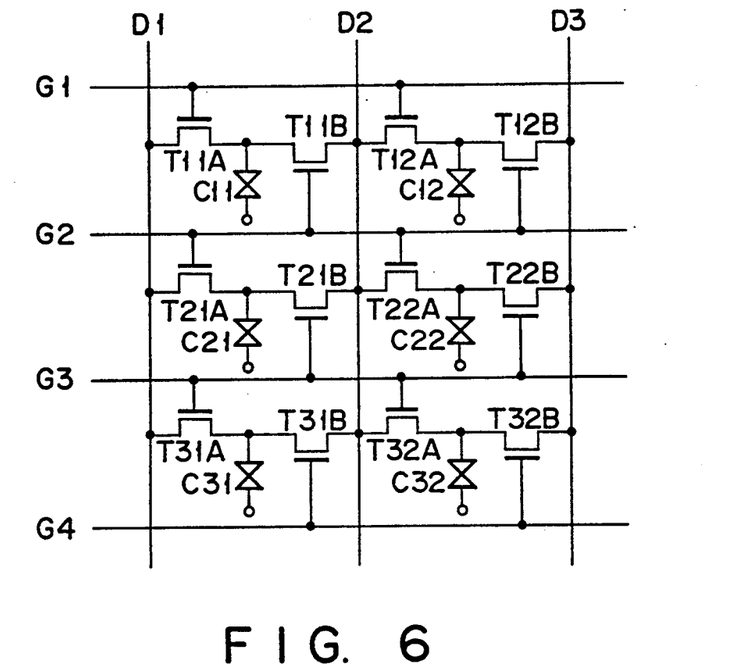
FIG. 6 is a schematic view showing another form of a pixel array block in the active matrix type display device.

FIG. 6 shows a third embodiment of the present invention. In this embodiment, display elements are arranged as a 3-rows × 2 columns display array. That is, C11 to C32, T11A, T11B to T32A, T32B, D1 to D3 and G1 to G4 represent display elements, field effect transistors, data lines and scanning lines, respectively. The connection relation among first and second field effect transistors and display elements are the same as that of the second embodiment. In the pixel array block arrangement, the writing of data relative to the display elements is achieved as will be set forth below.

In the odd-numbered frame, scanning line G2 is selected and data signals to be written into display elements C11 and C12 are applied through data lines D2 and D3. As a result, normal data are written into display elements C11 and C12. At this time, signals the same as those to be written into the diagonally left-up display elements in a display matrix array are written as back-up data into display elements C21 and C22. Then scanning line G2 is not selected and scanning line G3 is selected. The data signals to be written into display elements C21 and C22 are applied through data lines D2 and D3, allowing the display data of display elements C21 and C22 to be rewritten as normal data. At this time, signals the same as normal data signals written into the diagonally left-up display elements are written as back-up data signals into display elements C31 and C32. Then scanning line G3 is not selected and scanning line G4 is selected. Data signals to be written into display elements C31 and C32 are applied via data lines D2 and D3, allowing the display data of display elements C31 and C32 to be rewritten as normal data.

In the even-numbered frame, scanning line G3 is selected and data signals to be written into display elements C31 and C32 are applied via data lines D1 and D2. As a result, normal data signals are written into display elements C31 and C32. At this time, signals the same as the normal signals to be written into the diagonally left-down display element in the display array matrix are written as back-up data signals into display elements C21 and C22. Then scanning line G3 is not selected and scanning line G2 is selected. The data signals to be written into display elements C21 and C22 are applied via data lines D1 and D2 and the back-up display data of display elements C21 and C22 are re-written as normal display data. At this time, signals the same as normal signals to be written into the corresponding display elements are written as back-up data signals into display elements C11 and C12 and data signals to be written into display elements C11 and C12 are applied via data lines D1 and D2, allowing the display data of display elements C11 and C12 to be rewritten as normal data.

As set forth above, two types of routes can be employed in the embodiment shown in FIG. 6: one route is selected in the order of G3→G4→G1 with the use of data lines D2 and D3 and the other route is selected in the order of G2→G1→G4 with the use of data lines D1 and D2.

In this way, for the odd- and even-numbered frames, the writing of the normal display data is achieved relative to each of display elements C11 to C32. That is, even in the embodiment shown in FIG. 6, the respective pixel has two types of data input routes: one route for the back-up data signal and the other route for the normal data signal. The display array structure tolerates a defect in the switching elements as well as a break in the connection lines and can achieve a normal display.

Although the present invention has been explained as being applied to the liquid crystal display element, it can of course be applied equally to a fluorescent character display tube and active matrix type electroluminescence device including the same select means as that of the liquid crystal element. Although the present invention has been explained as using field effect transistors as the switching elements, it can use, for example, diodes and bipolar transistors. In the embodiment shown in FIG. 3, the identical pixel array blocks are repetitively arranged in the row direction, but the pixel array blocks as shown in FIGS. 4 and 5 may be arranged in any proper combination in which case it is still possible to obtain the same effects. Although the aforementioned embodiments have been explained in connection with two or three rows of pixel array blocks, the present invention is not restricted to the aforementioned embodiments. The present invention can properly be achieved within a range in which the select cycle of the scanning lines drastically never varies from location to location of the scanning lines.

Figure 7:
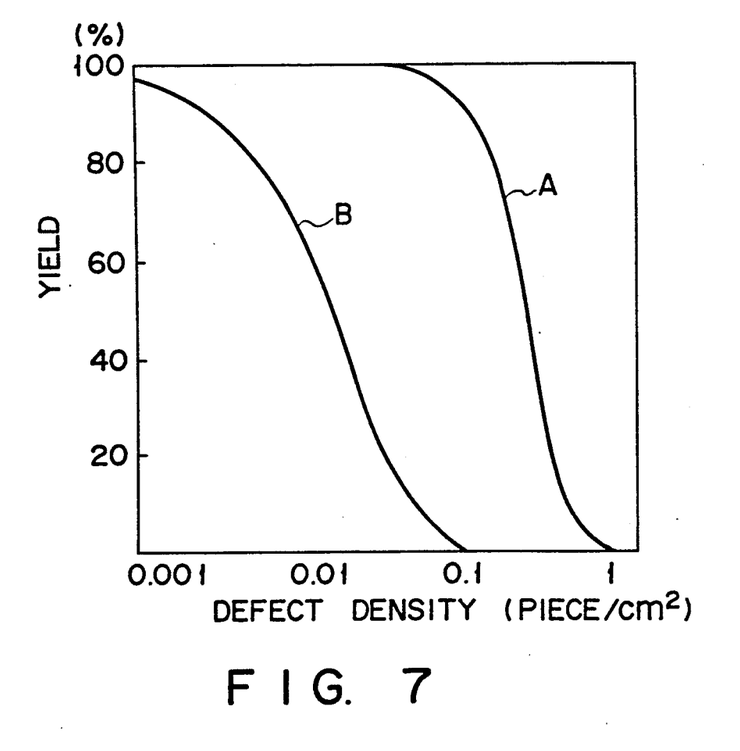
FIG. 7 is a graph showing a comparison in manufacturing yield between the active matrix type display device of the present invention and a conventional counterpart.

Even in the aforementioned embodiments, a plurality of data input routes for writing data signals into the corresponding display elements in the matrix array of unit pixel blocks and, even if defects or imperfections occur locally in some write-in routes, it is still possible to maintain a normal image display. It is thus possible to incorporate the present invention into an active matrix type display device of large area and high definition type and, in this case, a high yield can be obtained at low cost without increasing the manufacturing steps. If, for example, the present invention is applied to a 400×600-dots active matrix type display device, it will be appreciated from the graph in FIG. 7 that, at an area of 0.01 pieces/cm$^2$ in defect density, the device of the present invention reveals a higher yield as indicated by the curve A than the conventional device as indicated by the curve B. This shows a marked defect remedial effect as compared with the conventional devices.

Figure 8:
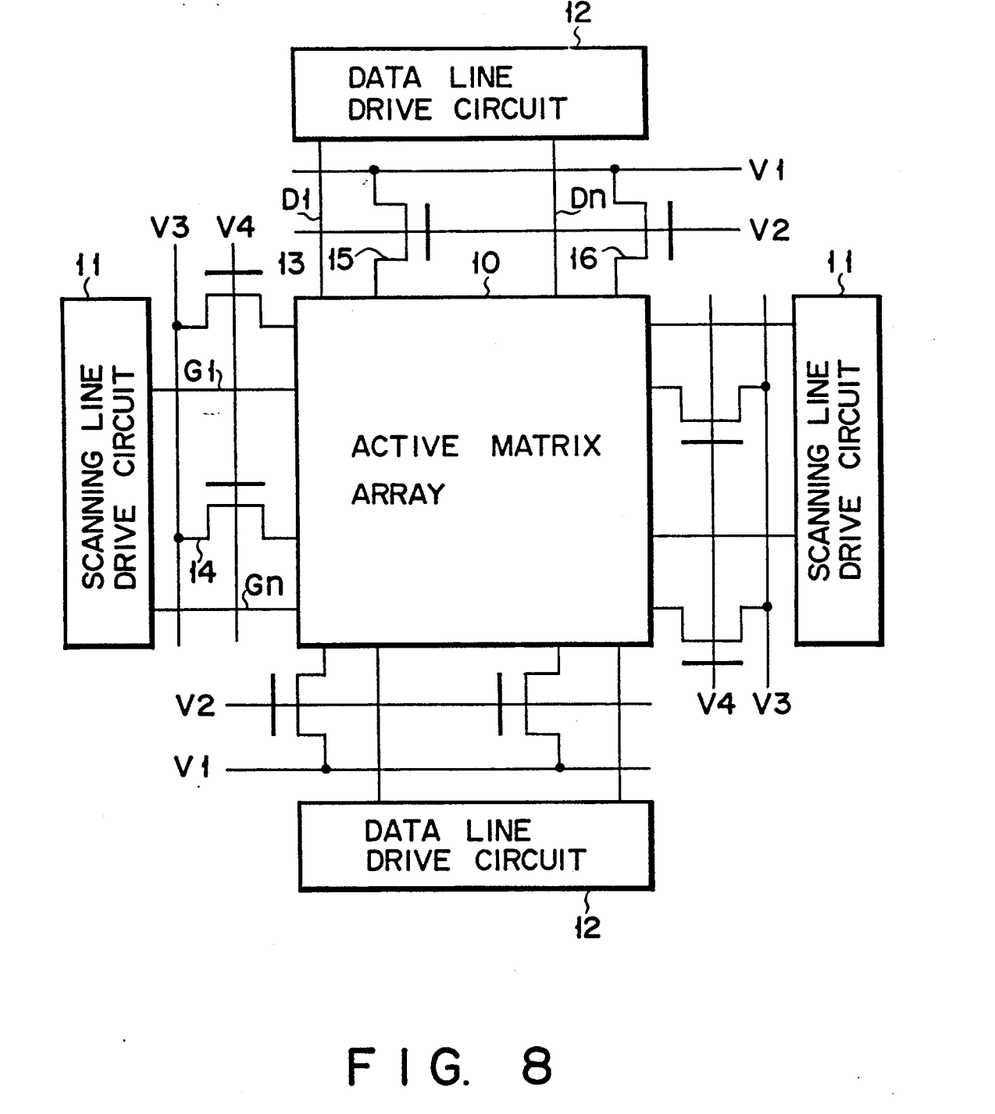
FIG. 8 is a diagrammatical view showing a practical apparatus with the present display device incorporated therein.

FIG. 8 shows a practical active matrix display array with drive circuits connected to data and scanning lines. In the arrangement shown in FIG. 8, scanning line drive circuit 11 is connected to scanning lines G1 . . . Gn of active matrix array 10 and data line drive circuit 12 is connected to data lines D1 . . . Dn. Voltage-fixing transistors 13, 14 and 15, 16 are applied respectively to those scanning line terminals not connected to associated drive circuit 11 and those data line terminals not connected to associated drive circuit 12 in which case voltages V3 and V1 are applied as fixed ones, respectively.

In the arrangement shown in FIG. 8, when a break or an imperfection occurs, for example, at one scanning line, a voltage across the broken or imperfect spot and the "not-connected" terminal of that scanning line is fixed to a V3 level without being floated. If, therefore, the voltage V3 is set at a level below the threshold level of the switching transistor in the pixel circuit, then it is possible to positively prevent writing of erroneous display data.

Similarly, even if any break occurs at the data line, the voltage on the broken spot can be fixed to a voltage V1 by the voltage fixing transistor.

Figure 9:
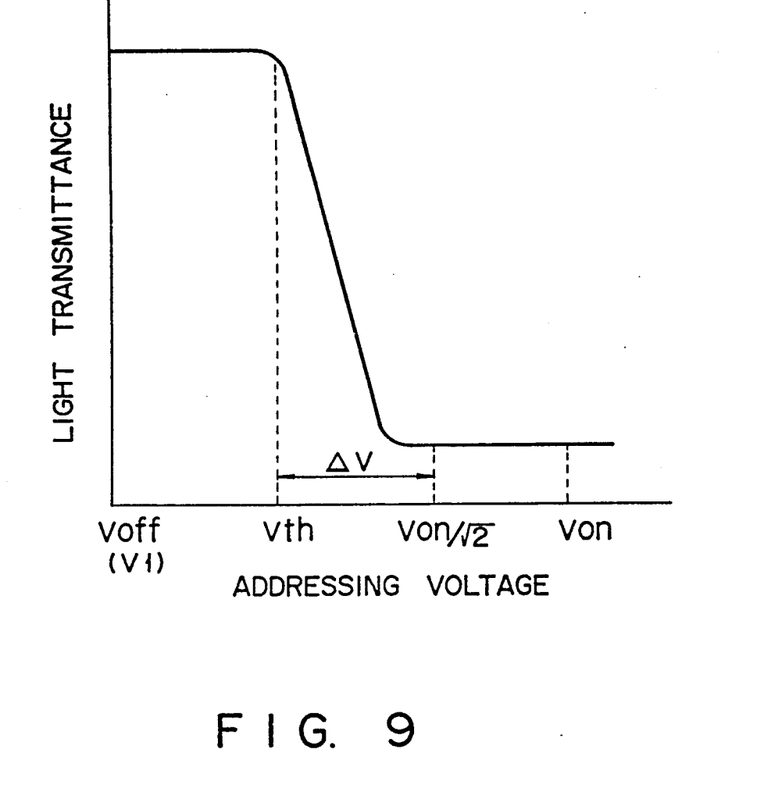
FIG. 9 is a graph showing the threshold value characteristic of a liquid crystal.

The light transmittance of the liquid crystal has a threshold value characteristic as shown in FIG. 9. By setting a voltage V1 at a level (Voff=0) lower than that of a threshold value Vth and setting Von of the display data signal and threshold voltage of the liquid crystal such that an effective voltage $Von/\sqrt{2}$ when voltages Von and V1 are alternately applied to the liquid crystal segments for each frame becomes greater than Vth+ΔV, it is possible to make a light/dark normal display in spite of the presence of some local breaks or imperfections.

What is claimed is:

1. A method of operation for an active matrix type display device including:

an m number (m≧2) of pixel array blocks arranged in a row direction, each pixel array block having a plurality of display elements (Cij; i=1,2, . . . k; j=1 . . . n) arranged as a K rows×n columns (K≧2, n≧1) array;

a K+1 number of scanning lines (G1, . . . , GK+1) arranged in said row direction in each pixel array block to supply scanning signals for selectively scanning the corresponding display elements;

a j+1 number of data lines (D1 . . . Dj+1) arranged in a column direction in each pixel array block to supply data signals to the corresponding display elements and located in an intersecting fashion to said scanning lines; and first and second switching elements (TKnA, TKnB) connected between the data lines and the corresponding display element and independently connected to two adjacent scanning lines, respectively, between which the respective display element for the first and second switching elements is located, whereby different display data input routes are established relative to the display elements via two adjacent data lines in a j+1 number of data lines, said method comprising the step of enabling the display elements on a respective row which are included into said plurality of display elements in the matrix array constituted by the pixel array block to display back-up and normal display data for respective odd-and-even-numbered frames, and including the steps of:

(a) sequentially writing normal red, green and blue display data into the corresponding display elements on one row, while at the same time sequentially writing back-up red, green and blue display data into diagonally adjacent corresponding display elements, in accordance with scanning signals selected by a common scanning line, relative to display elements, located between one row and another adjacent row; and (b) writing the normal red, green and blue display data into said diagonally adjacent display elements, in place of said back-up red, green and blue display data, in accordance with scanning signals selected by another scanning line adjacent to said scanning line.

* * * * *

UNITED STATES PATENT AND TRADEMARK OFFICE
CERTIFICATE OF CORRECTION

PATENT NO. : 5,012,228
DATED : April 30, 1991
INVENTOR(S) : MASUDA et al

It is certified that error appears in the above-identified patent and that said Letters Patent is hereby corrected as shown below:

Title page, Section [73] Assignee:

The full name of the Assignee should read:

--Nippon Telegraph and Telephone Corporation--

Signed and Sealed this

Tenth Day of November, 1992

Attest:

DOUGLAS B. COMER

*Attesting Officer*  *Acting Commissioner of Patents and Trademarks*